(12) United States Patent
Ichikawa

(10) Patent No.: US 7,750,505 B2
(45) Date of Patent: Jul. 6, 2010

(54) POWER SUPPLY SYSTEM AND VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 12/226,346

(22) PCT Filed: Apr. 16, 2007

(86) PCT No.: PCT/JP2007/058688

§ 371 (c)(1),
(2), (4) Date: Oct. 16, 2008

(87) PCT Pub. No.: WO2007/123222

PCT Pub. Date: Jan. 11, 2007

(65) Prior Publication Data

US 2009/0058329 A1    Mar. 5, 2009

(30) Foreign Application Priority Data

Apr. 24, 2006    (JP) .............................. 2006-119401

(51) Int. Cl.
*H02J 1/00*    (2006.01)
*H02J 3/00*    (2006.01)
(52) U.S. Cl. .......................... 307/82; 318/139; 320/128
(58) Field of Classification Search .................. 307/18, 307/52, 58, 62, 82; 320/104
See application file for complete search history.

(56) References Cited

U.S. PATENT DOCUMENTS 6,608,396 B2    8/2003    Downer et al.
6,710,575 B2    3/2004    Youn
6,954,365 B2 *  10/2005   Deguchi ....................... 363/65
7,248,490 B2 *  7/2007    Olsen et al. ................... 363/71
7,283,814 B2 *  10/2007   Klein et al. .................. 455/419
7,446,432 B2 *  11/2008   Cha ............................ 307/64

FOREIGN PATENT DOCUMENTS

| JP | A-2000-116014 | 4/2000 |
| JP | A-2000-253580 | 9/2000 |
| JP | A-2002-10502  | 1/2002 |

(Continued)

OTHER PUBLICATIONS

Russian Office Action for Patent Application No. 2008146075 issued on Nov. 5, 2009.

*Primary Examiner*—Edward Tso
*Assistant Examiner*—Ramy Ramadan
(74) *Attorney, Agent, or Firm*—Oliff & Berridge, PLC

(57) ABSTRACT

A maximum value selection unit (50) receives battery voltage values (Vb1, Vb2) and outputs the maximum value thereof to a lower limit value limiting unit (54). A maximum value selection unit (52) receives required voltage values (Vm1*, Vm2*) and outputs the maximum value thereof to the lower limit value limiting unit (54). The lower limit value limiting unit (54) outputs a voltage reference value (Vh*) by limiting the value so as not to fall below an output value of the maximum value selection unit (50). Switching commands (PWC1, PWC2) are generated based on a control computation using a combination of a voltage feedback control element and a voltage feedforward element, and a control computation using a combination of a current feedback control element and a voltage feedforward element, respectively.

15 Claims, 9 Drawing Sheets

FOREIGN PATENT DOCUMENTS

| | | |
|---|---|---|
| JP | A-2003-209969 | 7/2003 |
| JP | A-2003-309997 | 10/2003 |
| JP | A-2004-15866 | 1/2004 |
| RU | 2 025 862 C1 | 12/1994 |
| WO | WO 2005/105511 A1 | 11/2005 |

* cited by examiner

FIG.3

|  |  | SR1 | Q1A | Q1B |
|---|---|---|---|---|
| CONTROL READY STATE | | ON | OFF | OFF |
| DURING BOOST OPERATION | $Vh > Vh^*$ | ON | ON | OFF |
| | $Vh \leq Vh^*$ | ON | ON | ON/OFF |

POWER SUPPLY SYSTEM AND VEHICLE

TECHNICAL FIELD

The present invention relates to a power supply system including a plurality of power storage units and a vehicle equipped with the power supply system. In particular, the present invention relates to a technique suppressing unwanted electric energy shift between power storage units.

BACKGROUND ART

In recent years, considering environmental issues, attention has been paid to a vehicle employing an electric motor as a source of drive force, such as an electric vehicle, a hybrid vehicle, and a fuel cell vehicle. Such a vehicle is equipped with a power storage unit implemented for example by a rechargeable battery for supplying electric power to the electric motor and converting kinetic energy to electric energy during regenerative braking.

In such a vehicle employing an electric motor as a source of drive force, it is desirable to further increase the charge/discharge capacity of a power storage unit to improve acceleration performance and running performance such as a maximum traveling distance. As a method for increasing the charge/discharge capacity of a power storage unit, a configuration equipped with a plurality of power storage units has been proposed.

For example, U.S. Pat. No. 6,608,396 discloses an electric motor power management system providing a high-voltage vehicle traction system with a desired high direct current (DC) voltage level. The electric motor power management system includes a plurality of power stages connected in parallel and each having a battery and a boost/buck DC-DC converter for supplying DC power to at least one inverter, and a controller controlling the plurality of power stages such that the plurality of power stages can maintain a voltage output to the at least one inverter by uniformly charging/discharging the batteries of the plurality of power stages.

It is disclosed that, in the electric motor power management system, each battery is actively maintained to be in the same SOC (State of Charge) as that of other batteries in the system. However, batteries in the same SOC do not always have the same power storage voltage value (i.e., a voltage value at an open end), because the voltage value of each battery greatly varies depending on the temperature of the battery, the degree of deterioration, and the like, in addition to the SOC.

On the other hand, at system start-up or the like, buck switches 38 are all turned ON in FIG. 1 of U.S. Pat. No. 6,608,396, and thus the batteries are connected in parallel to an identical high voltage DC bus 48 (power line) through respective boost/buck DC-DC converters 13 (voltage conversion units). Therefore, when the batteries have different voltage values, a current corresponding to the voltage difference flows between the batteries, causing unwanted electric energy shift between the batteries and increasing loss.

DISCLOSURE OF THE INVENTION

The present invention has been made to solve such a problem, and one object of the present invention is to provide a power supply system and a vehicle suppressing unwanted electric energy shift between power storage units and avoiding occurrence of loss.

A power supply system in accordance with one aspect of the present invention has a plurality of power storage units each configured to be chargeable/dischargeable, and includes: a power line configured to allow supply/reception of electric power between a load device and the power supply system; a plurality of voltage conversion units provided between the plurality of power storage units and the power line, respectively, and each performing voltage conversion operation between the corresponding power storage unit and the power line; power storage voltage value obtaining means obtaining a power storage voltage value for each of the plurality of power storage units; and voltage reference value determination means determining a voltage reference value of electric power to be supplied to the load device in accordance with an operation status of the load device. Each of the plurality of voltage conversion units performs the voltage conversion operation in accordance with the voltage reference value determined by the voltage reference value determination means, and the voltage reference value determination means limits the voltage reference value not to fall below the maximum power storage voltage value of the power storage voltage values obtained by the power storage voltage value obtaining means.

According to the power supply system in accordance with this aspect, the voltage reference value is limited so as not to fall below the maximum power storage voltage value of the power storage voltage values for the plurality of power storage units, and each of the plurality of power conversion units performs the voltage conversion operation in accordance with the voltage reference value. Since the voltage reference value is not less than a voltage value of the power line that can be charged by the power storage unit before control of the voltage conversion unit is started, each voltage conversion unit starts the voltage conversion operation immediately after the start of the control. Thereby, each voltage conversion unit operates to supply electric power from the corresponding power storage unit to the power line, and thus can avoid inflow of electric power from another power storage unit through the power line. Therefore, unwanted electric energy shift between the power storage units can be suppressed even when there is a voltage difference between the power storage units.

Preferably, the power supply system further includes required voltage value obtaining means obtaining at least one required voltage value for the load device, and the voltage reference value determination means further determines the voltage reference value to be not less than the maximum required voltage value of the at least one required voltage value obtained by the required voltage value obtaining means.

Preferably, the power supply system further includes voltage value detection means detecting a voltage value of the power line, and at least one of the plurality of voltage conversion units performs the voltage conversion operation in response to a result of a computation including a voltage feedback control element for matching the voltage value of the power line detected by the voltage value detection means with the voltage reference value.

Preferably, at least one of the plurality of voltage conversion units performs the voltage conversion operation in response to a result of a computation including a voltage feedforward control element reflecting a value corresponding to a ratio between the power storage voltage value of the corresponding power storage unit and the voltage reference value.

Preferably, the power supply system further includes battery current value detection means detecting a battery current value input/output to/from at least one of the plurality of power storage units, and the at least one voltage conversion unit performing the voltage conversion operation in response to the result of the computation including the voltage feedforward control element performs the voltage conversion operation in response to a result of a computation including a current feedback control element for matching the battery current value of the corresponding power storage unit detected by the battery current value detection means with each current reference value.

Preferably, each of the plurality of voltage conversion units includes a chopper circuit.

A power supply system in accordance with another aspect of the present invention has a plurality of power storage units each configured to be chargeable/dischargeable, and includes: a power line configured to allow supply/reception of electric power between a load device and the power supply system; a plurality of voltage conversion units provided between the plurality of power storage units and the power line, respectively, and each performing voltage conversion operation between the corresponding power storage unit and the power line; a power storage voltage value detection unit detecting a power storage voltage value for each of the plurality of power storage units; and a control unit. The control unit determines a voltage reference value of electric power to be supplied to the load device in accordance with an operation status of the load device. Each of the plurality of voltage conversion units performs the voltage conversion operation in accordance with the voltage reference value determined by the voltage reference value determination means. The control unit limits the voltage reference value not to fall below the maximum power storage voltage value of the power storage voltage values detected by the power storage voltage value detection unit.

A vehicle in accordance with still another aspect of the present invention includes: a power supply system having a plurality of power storage units each configured to be chargeable/dischargeable; and a drive force generation unit receiving electric power supplied from the power supply system to generate drive force. The power supply system includes: a power line configured to allow supply/reception of electric power between the drive force generation unit and the power supply system; a plurality of voltage conversion units provided between the plurality of power storage units and the power line, respectively, and each performing voltage conversion operation between the corresponding power storage unit and the power line; power storage voltage value obtaining means obtaining a power storage voltage value for each of the plurality of power storage units; and voltage reference value determination means determining a voltage reference value of electric power to be supplied to the drive force generation unit in accordance with an operation status of the drive force generation unit. Further, each of the plurality of voltage conversion units performs the voltage conversion operation in accordance with the voltage reference value determined by the voltage reference value determination means, and the voltage reference value determination means limits the voltage reference value not to fall below the maximum power storage voltage value of the power storage voltage values obtained by the power storage voltage value obtaining means.

According to the vehicle in accordance with this aspect, the voltage reference value is limited so as not to fall below the maximum power storage voltage value of the power storage voltage values for the plurality of power storage units, and each of the plurality of power conversion units performs the voltage conversion operation in accordance with the voltage reference value. Since the voltage reference value is not less than a voltage value of the power line that can be charged by the power storage unit before control of the voltage conversion unit is started, each voltage conversion unit starts the voltage conversion operation immediately after the start of the control. Thereby, each voltage conversion unit operates to supply electric power from the corresponding power storage unit to the power line, and thus can avoid inflow of electric power from another power storage unit through the power line. Therefore, unwanted electric energy shift between the power storage units can be suppressed even when there is a voltage difference between the power storage units.

Preferably, the drive force generation unit includes at least one power conversion unit configured to be capable of converting the electric power supplied from the power supply system, and at least one electric rotating machine connected to the corresponding power conversion unit and configured to be capable of generating the drive force.

Preferably, the power supply system further includes required voltage value obtaining means obtaining at least one required voltage value for the drive force generation unit, and the voltage reference value determination means further determines the voltage reference value to be not less than the maximum required voltage value of the at least one required voltage value obtained by the required voltage value obtaining means.

Preferably, the power supply system further includes voltage value detection means detecting a voltage value of the power line, and at least one of the plurality of voltage conversion units performs the voltage conversion operation in response to a result of a computation including a voltage feedback control element for matching the voltage value of the power line detected by the voltage value detection means with the voltage reference value.

Preferably, at least one of the plurality of voltage conversion units performs the voltage conversion operation in response to a result of a computation including a voltage feedforward control element reflecting a value corresponding to a ratio between the power storage voltage value of the corresponding power storage unit and the voltage reference value.

Preferably, the power supply system further includes battery current value detection means detecting a battery current value input/output to/from at least one of the plurality of power storage units, and the at least one voltage conversion unit performing the voltage conversion operation in response to the result of the computation including the voltage feedforward control element performs the voltage conversion operation in response to a result of a computation including a current feedback control element for matching the battery current value of the corresponding power storage unit detected by the battery current value detection means with each current reference value.

Preferably, each of the plurality of voltage conversion units includes a chopper circuit.

A vehicle in accordance with still another aspect of the present invention includes: a power supply system having a plurality of power storage units each configured to be chargeable/dischargeable; and a drive force generation unit receiving electric power supplied from the power supply system to generate drive force. The power supply system includes: a power line configured to allow supply/reception of electric power between the drive force generation unit and the power supply system; a plurality of voltage conversion units provided between the plurality of power storage units and the power line, respectively, and each performing voltage conversion operation between the corresponding power storage unit and the power line; power storage voltage value detection means detecting a power storage voltage value for each of the plurality of power storage units; and a control unit. The control unit determines a voltage reference value of electric power to be supplied to the drive force generation unit in accordance with an operation status of the drive force generation unit. Each of the plurality of voltage conversion units performs the voltage conversion operation in accordance with the voltage reference value determined by the voltage reference value determination means. The control unit limits the voltage reference value not to fall below the maximum power storage voltage value of the power storage voltage values obtained by the power storage voltage value obtaining means.

According to the present invention, a power supply system and a vehicle suppressing unwanted electric energy shift between power storage units and avoiding occurrence of loss can be implemented.

BRIEF DESCRIPTION OF THE DRAWINGS

FIG. 3 is a view for illustrating states of a system relay and transistors concerning voltage conversion operation of the converter.

BEST MODES FOR CARRYING OUT THE INVENTION

Figure 1:
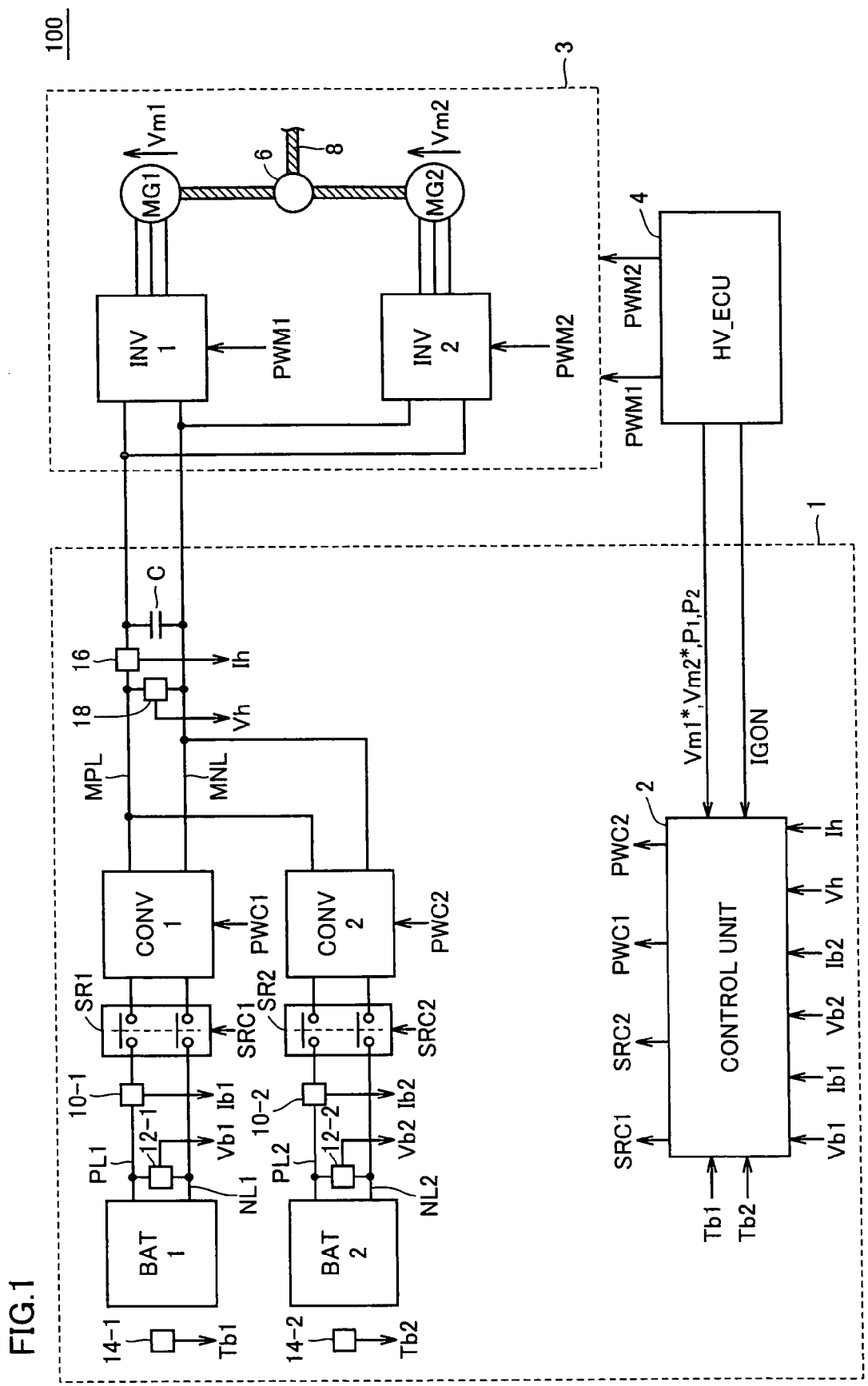
FIG. 1 is a schematic configuration diagram showing a substantial part of a vehicle including a power supply system in accordance with a first embodiment of the present invention.

Embodiments of the present invention will now be described in detail with reference to the drawings, in which identical or corresponding parts will be designated by the same reference numerals, and the description thereof will not be repeated.

First Embodiment

Referring to FIG. 1, a vehicle 100 including a power supply system 1 in accordance with a first embodiment of the present invention will be described. The first embodiment illustrates the case where a drive force generation unit 3 generating drive force for vehicle 100 is used as an example of a load device. Drive force generation unit 3 receives electric power from power supply system 1 to generate drive force, and supplies the drive force to wheels (not shown) of vehicle 100, causing vehicle 100 to run.

In the first embodiment, power supply system 1 having two power storage units as an example of a plurality of power storage units will be described. Power supply system 1 is configured to be capable of supplying and receiving DC power to and from drive force generation unit 3 through a main positive bus line MPL and a main negative bus line MNL.

Drive force generation unit 3 includes a first inverter INV1, a second inverter INV2, a first motor-generator MG1, and a second motor-generator MG2, and generates drive force in response to switching commands PWM1, PWM2 from a HV_ECU (Hybrid Vehicle Electronic Control Unit) 4.

Inverters INV1, INV2 are connected in parallel to main positive bus line MPL and main negative bus line MNL, and supply and receive electric power to and from power supply system 1. Specifically, inverters INV1, INV2 convert DC power received through main positive bus line MPL and main negative bus line MNL into alternate current (AC) power, and supply the AC power to motor-generators MG1, MG2, respectively. Further, inverters INV1, INV2 may be configured to convert AC power, generated by motor-generators MG1, MG2 receiving kinetic energy of vehicle 100 during regenerative braking of vehicle 100 or the like, into DC power and supply the DC power to power supply system 1 as regenerative power. For example, inverters INV1, INV2 are formed of a bridge circuit including switching elements for three phases, and generate three-phase AC power by performing switching (circuit opening/closing) operation in response to respective switching commands PWM1, PWM2 received from HV_ECU 4.

Motor-generators MG1, MG2 are configured to be capable of generating rotational drive force by receiving AC power supplied from inverters INV1, INV2, respectively, and generating AC power by receiving external rotational drive force. For example, motor-generators MG1, MG2 are a three-phase AC electric rotating machine including a rotor having permanent magnets embedded therein. Motor-generators MG1, MG2 are coupled to a motive power transfer mechanism 6 to transfer the generated drive force to the wheels (not shown) via a drive shaft 8.

If drive force generation unit 3 is applied to a hybrid vehicle, motor-generators MG1, MG2 are also coupled to an engine (not shown) via motive power transfer mechanism 6 or drive shaft 8. Then, HV_ECU 4 performs control to obtain an optimal ratio between the drive force generated by the engine and the drive force generated by motor-generators MG1, MG2. If drive force generation unit 3 is applied to such a hybrid vehicle, motor-generator MG1 may serve exclusively as an electric motor, and motor-generator MG2 may serve exclusively as a generator.

HV_ECU 4 executes a program stored in advance to calculate torque reference values and rotation speed reference values of motor-generators MG1, MG2, based on a signal transmitted from each sensor (not shown), a running situation, variation in an accelerator pedal position, a stored map, and the like. Then, HV_ECU 4 generates switching commands PWM1, PWM2 and supplies the commands to drive force generation unit 3 such that generated torques and rotation speeds of motor-generators MG1, MG2 match the calculated torque reference values and rotation speed reference values.

In addition, HV_ECU 4 obtains counter electromotive voltage values Vm1, Vm2 generated in motor-generators MG1, MG2, respectively, based on the calculated torque reference values and rotation speed reference values, or torque actual values and rotation speed actual values detected by various sensors (not shown), and outputs to power supply system 1 required voltage values Vm1*, Vm2* determined based on counter electromotive voltage values Vm1, Vm2. Specifically, HV_ECU 4 determines voltage values higher than counter electromotive voltage values Vm1, Vm2 as required voltage values Vm1*, Vm2* such that power supply system 1 can supply electric power to motor-generators MG1, MG2. Further, HV_ECU 4 obtains electric power actual values P1, P2 based on the products of the torque reference values and the rotation speed reference values, or the products of the torque actual values and the rotation speed actual values, and outputs electric power actual values P1, P2 to power supply system 1. It is to be noted that HV_ECU 4 informs power supply system 1 of the electric power supply/reception state in drive force generation unit 3 by changing the signs of electric power actual values P1, P2, for example, such that electric power consumption is represented by a positive value and electric power generation is represented by a negative value.

Furthermore, upon receiving an ignition-on signal IGON representing an activation command for vehicle 100 by means of an operation by a driver or the like, HV_ECU 4 outputs ignition-on signal IGON to a control unit 2.

On the other hand, power supply system 1 includes a smoothing capacitor C, a supply current value detection unit 16, a supply voltage value detection unit 18, a first converter CONV1, a second converter CONV2, a first power storage unit BAT1, a second power storage unit BAT2, battery current value detection units 10-1, 10-2, battery voltage value detection units 12-1, 12-2, battery temperature detection units 14-1, 14-2, system relays SR1, SR2, and control unit 2.

Smoothing capacitor C is connected between main positive bus line MPL and main negative bus line MNL, and reduces a fluctuation component contained in electric power supplied from converters CONV1, CONV2.

Supply current value detection unit 16 is disposed in main positive bus line MPL in series, detects a supply current value Ih of electric power supplied to drive force generation unit 3, and outputs the detection result to control unit 2.

Supply voltage value detection unit 18 is connected between main positive bus line MPL and main negative bus line MNL, detects a supply voltage value Vh of the electric power supplied to drive force generation unit 3, and outputs the detection result to control unit 2.

Converters CONV1, CONV2 are connected in parallel to main positive bus line MPL and main negative bus line MNL, and perform voltage conversion operation between corresponding power storage units BAT1, BAT2 and main positive bus line MPL and main negative bus line MNL. More specifically, converters CONV1, CONV2 boost discharge power from power storage units BAT1, BAT2 up to a voltage reference value, respectively, to generate supply power. For example, converters CONV1, CONV2 include a chopper circuit.

Power storage units BAT1, BAT2 are connected in parallel to main positive bus line MPL and main negative bus line MNL through system relays SR1, SR2 and converters CONV1, CONV2, respectively. For example, power storage units BAT1, BAT2 are implemented by a rechargeable battery configured to be chargeable/dischargeable, such as a nickel hydride battery or a lithium ion battery, or by a capacitance element with relatively large capacity such as an electric double layer capacitor.

Battery current value detection units 10-1, 10-2 are disposed in power lines connecting power storage units BAT1, BAT2 to converters CONV1, CONV2, respectively, detect battery current values Ib1, Ib2 related to input/output of power storage units BAT1, BAT2, respectively, and output the detection result to control unit 2.

Battery voltage value detection units 12-1, 12-2 are connected between power lines connecting power storage units BAT1, BAT2 to converters CONV1, CONV2, respectively, detect battery voltage values Vb1, Vb2 of power storage units BAT1, BAT2, respectively, and output the detection result to control unit 2.

Battery temperature detection units 14-1, 14-2 are arranged in the proximity of battery cells or the like constituting power storage units BAT1, BAT2, respectively, detect battery temperatures Tb1, Tb2 representing internal temperatures of power storage units BAT1, BAT2, respectively, and output the detection result to control unit 2. It is to be noted that battery temperature detection units 14-1, 14-2 may also be configured to output representative values obtained for example by averaging processing, based on the result of detection by a plurality of detection elements arranged in correspondence with a plurality of battery cells constituting power storage units BAT1, BAT2, respectively.

System relays SR1, SR2 are disposed between converters CONV1, CONV2 and power storage units BAT1, BAT2, respectively, and electrically connect or disconnect converters CONV1, CONV2 with power storage units BAT1, BAT2 in response to relay commands SRC1, SRC2 received from control unit 2.

Upon receiving ignition-on signal IGON from HV_ECU 4, control unit 2 activates relay commands SRC1, SRC2 to turn on system relays SR1, SR2. Subsequently, control unit 2 generates switching commands PWC1, PWC2 in accordance with a control structure described later, based on required voltage values Vm1*, Vm2* and electric power actual values P1, P2 received from HV_ECU 4, supply current value Ih received from supply current value detection unit 16, supply voltage value Vh received from supply voltage value detection unit 18, battery current values Ib1, Ib2 received from battery current value detection units 10-1, 10-2, battery voltage values Vb1, Vb2 received from battery voltage value detection units 12-1, 12-2, and battery temperatures Tb1, Tb2 received from battery temperature detection units 14-1, 14-2, respectively, and supplies the switching commands to converters CONV1, CONV2, respectively.

More specifically, control unit 2 determines the higher of required voltage values Vm1*, Vm2* received from HV_ECU 4 as a voltage reference value Vh* of the supply power, such that voltage reference value Vh* does not fall below the maximum battery voltage value of battery voltage values Vb1, Vb2, that is, the minimum value of voltage reference value Vh* is limited to the maximum battery voltage value. Then, control unit 2 generates switching commands PWC1, PWC2 such that converters CONV1, CONV2 perform the voltage conversion operation in accordance with voltage reference value Vh*.

Particularly in the first embodiment of the present invention, converter CONV1 performs the voltage conversion operation in response to a result of a control computation including a voltage feedback control element for matching supply voltage value Vh with voltage reference value Vh*, and a voltage feedforward control element adding a value corresponding to a ratio between battery voltage value Vb1 of power storage unit BAT1 and voltage reference value Vh* (voltage conversion ratio). On the other hand, converter CONV2 performs the voltage conversion operation in response to a result of a control computation including a current feedback control element for matching battery current value Ib2 with a current reference value Ib2*, and a voltage feedforward control element adding a value corresponding to a ratio between battery voltage value Vb2 of power storage unit BAT2 and voltage reference value Vh* (voltage conversion ratio). It is to be noted that current reference value Ib2* is determined based on the state of charge (hereinafter simply also referred to as the "SOC") of power storage unit BAT2 and a required electric power value of drive force generation unit 3.

Since voltage reference value Vh* is determined by reflecting battery voltage values Vb1, Vb2 as described above, unwanted electric energy shift between power storage units BAT1 and BAT2 can be suppressed. Further, since the values corresponding to the ratios between battery voltage values Vb1, Vb2 and voltage reference value Vh* (voltage conversion ratios) are output as initial values by the voltage feedforward control elements, converters CONV1, CONV2 start the voltage conversion operation immediately after the start of control. Thereby, a circulation current between power storage units BAT1 and BAT2 that may be caused immediately after the start of control can also be suppressed.

Control unit 2 calculates the states of charge SOC1, SOC2 in power storage units BAT1, BAT2, based on battery current values Ib1, Ib2, battery voltage values Vb1, Vb2, and battery temperatures Tb1, Tb2, respectively. Various well-known techniques can be employed for calculating the SOCs of power storage units BAT1, BAT2. For example, control unit 2 sequentially detects the SOCs by adding provisional SOCs calculated from battery voltage values Vb1, Vb2 in an open circuit condition (open circuit voltage values) to corrective SOCs calculated from accumulated values of battery current values Ib1, Ib2. Further, control unit 2 derives discharge allowable power Wout1, Wout2 based on detected SOC1, SOC2 of power storage units BAT1, BAT2. Discharge allowable power Wout1, Wout2 refer to restriction values of charge power and/or discharge power for a short period of time at each time point, that are defined as limit values in terms of chemical reaction. For example, control unit 2 stores a map of allowable power in which the SOC and the battery temperature experimentally obtained in advance are defined as parameters, and derives discharge allowable power Wout1, Wout2 at each time point in accordance with detected SOC1, SOC2 and battery temperatures Tb1, Tb2. Control unit 2 determines current reference value Ib2* of power storage unit BAT2 so as not to exceed discharge allowable power Wout2 derived as described above.

As to the correspondence between FIG. 1 and the invention of the present application, drive force generation unit 3 corresponds to the "load device", main positive bus line MPL and main negative bus line MNL correspond to the "power line", and converters CONV1, CONV2 correspond to the "plurality of voltage conversion units."

Figure 2:
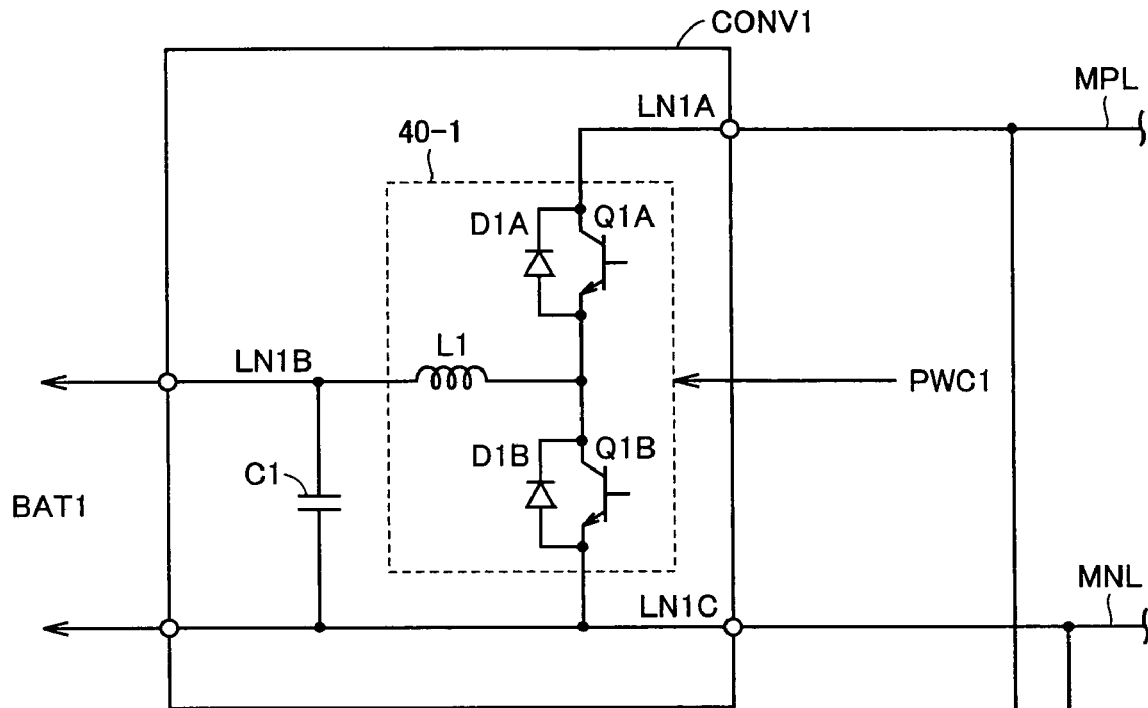
FIG. 2 is a schematic configuration diagram of a converter in accordance with the first embodiment of the present invention.
Figure 2:
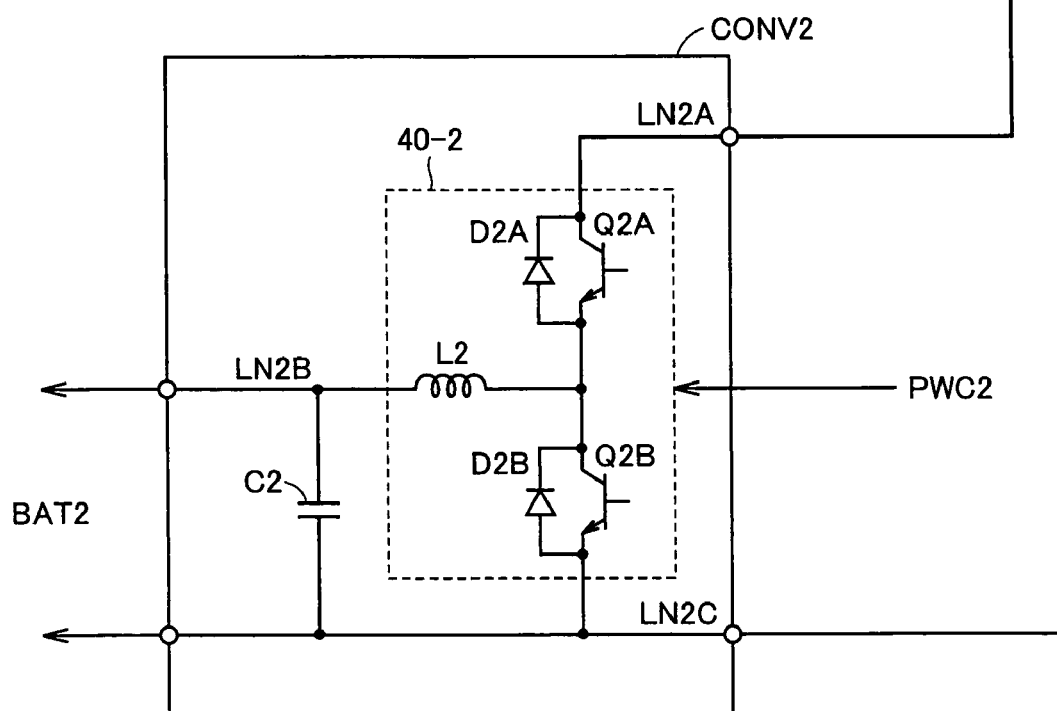

Referring to FIG. 2, converter CONV1 includes a chopper circuit 40-1 and a smoothing capacitor C1.

Chopper circuit 40-1 can supply electric power bidirectionally. Specifically, chopper circuit 40-1 can boost discharge power from power storage unit BAT1 in response to switching command PWC1 from control unit 2 (FIG. 1) to supply the boosted discharge power to drive force generation unit 3 (FIG. 1), and can buck regenerative power received from drive force generation unit 3 to supply the bucked regenerative power to power storage unit BAT1. Chopper circuit 40-1 includes a positive bus line LN1A, a negative bus line LN1C, a line LN1B, transistors Q1A, Q1B serving as switching elements, diodes D1A, D1B, and an inductor L1.

Positive bus line LN1A has one end connected to a collector of transistor Q1A and the other end connected to main positive bus line MPL. Negative bus line LN1C has one end connected to the negative side of power storage unit BAT1 and the other end connected to main negative bus line MNL.

Transistors Q1A and Q1B are connected in series between positive bus line LN1A and negative bus line LN1C. The collector of transistor Q1A is connected to positive bus line LN1A, and an emitter of transistor Q1B is connected to negative bus line LN1C. Diodes D1A, D1B allowing current to flow from the emitter side to the collector side are connected between the collector and the emitter of transistors Q1A, Q1B, respectively. Further, inductor L1 is connected to a connection point of transistor Q1A and transistor Q1B.

Line LN1B has one end connected to the positive side of power storage unit BAT1 and the other end connected to inductor L1.

Smoothing capacitor C1 is connected between line LN1B and negative bus line LN1C, and reduces AC component contained in DC voltage between line LN1B and negative bus line LN1C.

Hereinafter, the voltage conversion operation of converter CONV1 will be described. In boost operation, control unit 2 (FIG. 1) maintains transistor Q1A in an ON state, and turns on/off transistor Q1B at a prescribed duty ratio. During an ON period of transistor Q1B, a discharge current flows from power storage unit BAT1 to main positive bus line MPL, sequentially through line LN1B, inductor L1, transistor Q1A, and positive bus line LN1A. At the same time, a pump current flows from power storage unit BAT1, sequentially through line LN1B, inductor L1, transistor Q1B, and negative bus line LN1C. Inductor L1 accumulates electromagnetic energy by means of the pump current. Subsequently, when transistor Q1B makes transition from an ON state to an OFF state, inductor L1 superimposes the accumulated electromagnetic energy onto the discharge current. As a result, an average voltage of DC power supplied from converter CONV1 to main positive bus line MPL and main negative bus line MNL is boosted by a voltage corresponding to the electromagnetic energy accumulated in inductor L1 in accordance with the duty ratio.

Referring to FIG. 3, upon receiving ignition-on signal IGON from HV_ECU 4, control unit 2 turns on system relay SR1 to attain a control ready state. In the control ready state, the discharge current flows from power storage unit BAT1, sequentially through line LN1B, inductor L1, diode D1A, and main positive bus line MPL, to charge smoothing capacitor C.

When control is started thereafter, control unit 2 activates transistor Q1A to attain an ON state, and turns on/off transistor Q1B such that supply voltage value Vh (actual value) matches voltage reference value Vh*. Specifically, if supply voltage value Vh≦voltage reference value Vh*, control unit 2 turns on/off transistor Q1B at a duty ratio corresponding to the deviation, and if supply voltage value Vh>voltage reference value Vh*, control unit 2 determines that further boost operation is not needed and maintains Q1B in an OFF state (duty ratio=0). In this manner, transistor Q1A is always maintained in an ON state during the boost operation of converter CONV1.

Since the configuration and the operation of converter CONV2 are also similar to those of converter CONV1 described above, the detailed description thereof will not be repeated.

Figure 4A:
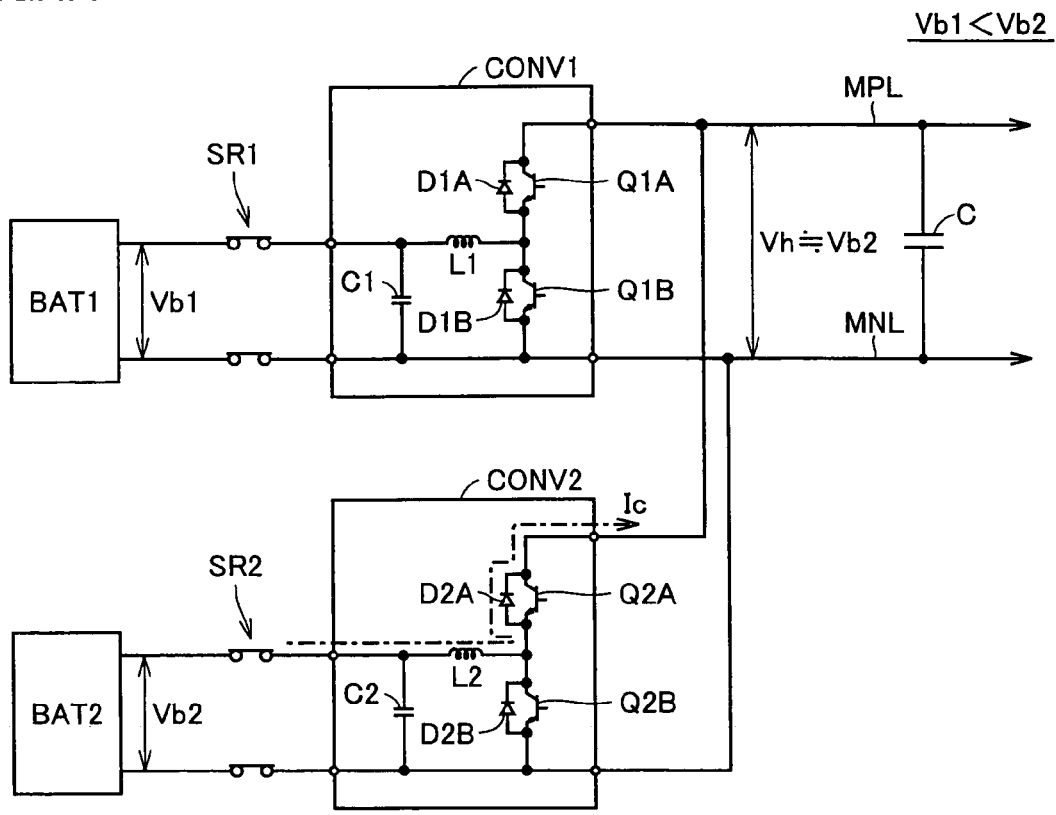
FIGS. 4A and 4B are views for illustrating electric energy shift between power storage units caused when boost operation control is started.
Figure 4B:
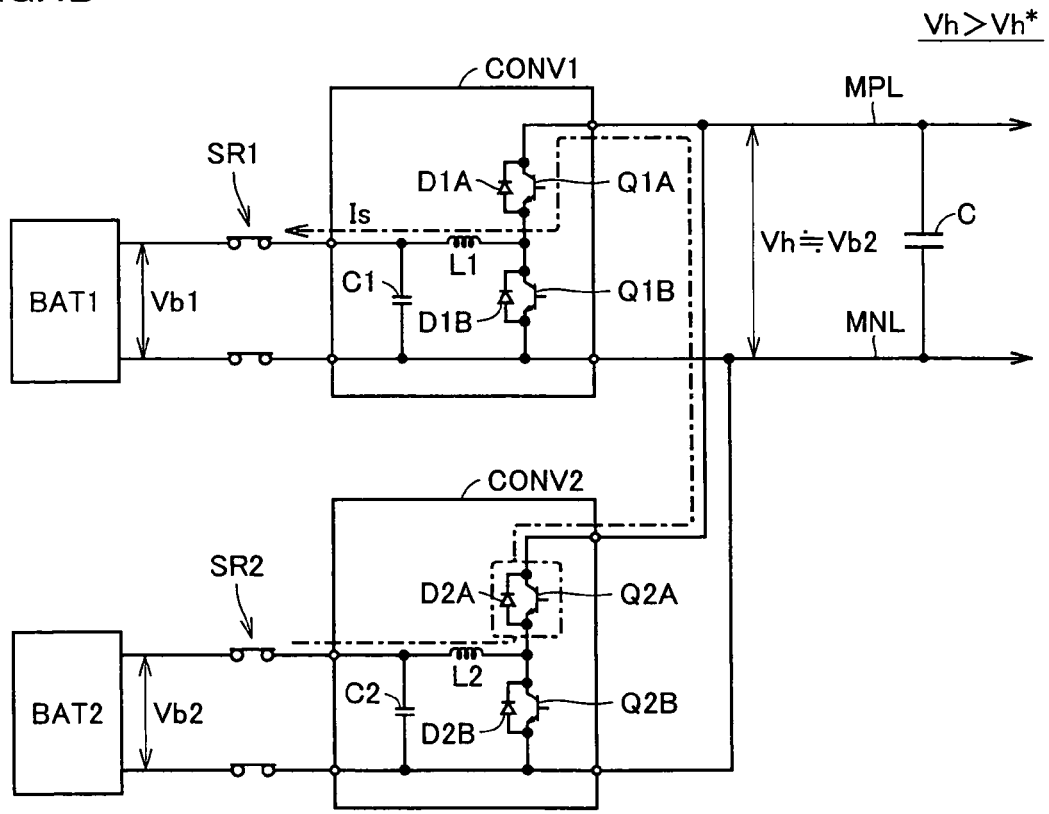

Referring to FIGS. 4A and 4B, electric energy shift between power storage units BAT1 and BAT2 caused when boost operation control is started will be described. FIG. 4A shows a manner of converters CONV1, CONV2 from during preparation for the control to attaining the control ready state, and FIG. 4B shows a manner of converters CONV1, CONV2 immediately after the start of the control.

Referring to FIG. 4A, since control unit 2 turns on system relays SR1, SR2 upon receiving ignition-on signal IGON, smoothing capacitor C is charged by the discharge current from power storage units BAT1, BAT2. For example, if battery voltage value Vb1<battery voltage value Vb2, smoothing capacitor C is charged by the discharge current from power storage units BAT1 and BAT2 until its charge voltage matches battery voltage value Vb1. Then, if the charge voltage exceeds battery voltage value Vb1, smoothing capacitor C is charged by a charge voltage Ic from power storage unit BAT2, and its final charge voltage (supply voltage value Vh) substantially matches battery voltage value Vb2 of power storage unit BAT2.

Referring to FIG. 4B, if voltage reference value Vh* is determined such that supply voltage value Vh>voltage reference value Vh* immediately after the start of the boost operation control, converters CONV1, CONV2 do not perform boost operation. As a result, a circulation current Is from power storage unit BAT2 to power storage unit BAT1 occurs through main positive bus line MPL and transistor Q1A maintained in an ON state. Such circulation current Is causes unwanted electric energy shift between the power storage units. Further, since the magnitude of circulation current Is is determined in accordance with a voltage difference between battery voltage value Vb1 and battery voltage value Vb2, whereas the electric resistance between power storage units BAT1 and BAT2 is designed to be small, an extremely large circulation current Is may occur when the voltage difference is relatively large (for example around 50V), causing damage to power storage units BAT1 and BAT2.

Therefore, in the first embodiment of the present invention, voltage reference value Vh* is limited so as not to fall below the maximum battery voltage value of battery voltage values Vb1, Vb2.

Figure 5:
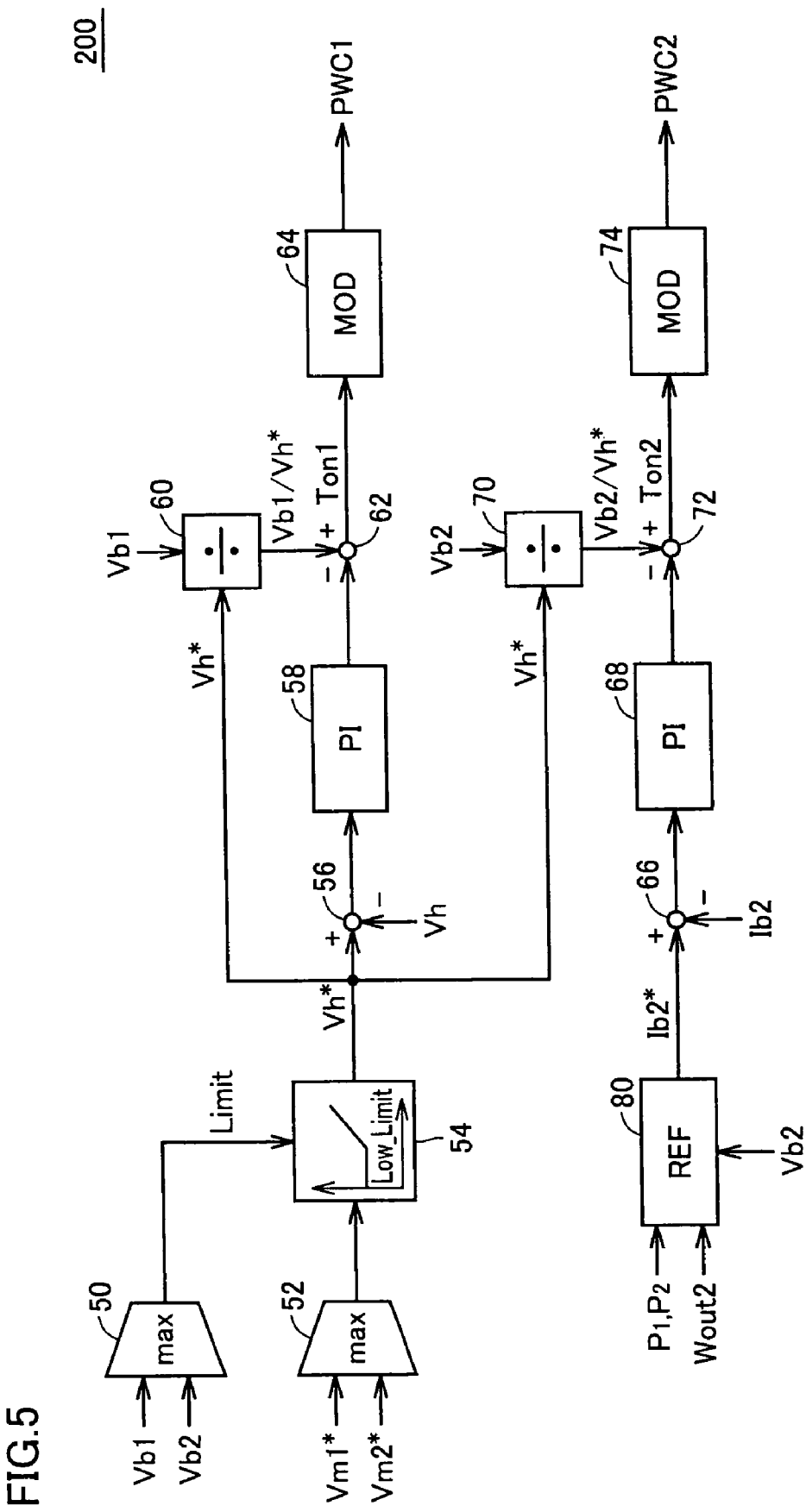
FIG. 5 is a view showing a control block for controlling the converter in accordance with the first embodiment of the present invention.

Referring to FIG. 5, a control block 200 for controlling converters CONV1, CONV2 in accordance with the first embodiment of the present invention will be described. Control block 200 includes maximum value selection units 50, 52, a lower limit value limiting unit 54, a current reference value determination unit (REF) 80, subtraction units 56, 62, 66, 72, proportional integration units (PI) 58, 68, division units 60, 70, and modulation units (MOD) 64, 74.

The maximum value selection unit 50 receives battery voltage values Vb1 and Vb2, and outputs the maximum value thereof to lower limit value limiting unit 54. The maximum value selection unit 52 receives required voltage values Vm1* and Vm2*, and outputs the maximum value thereof to lower limit value limiting unit 54.

Lower limit value limiting unit 54 receives an output value from the maximum value selection unit 52 as an input, and receives an output value from the maximum value selection unit 50 as a lower limit value. Then, lower limit value limiting unit 54 limits the value received as the input so as not to fall below the lower limit value, and outputs the limited value as voltage reference value Vh*. Specifically, when the output value from the maximum value selection unit 52 is smaller than the output value from the maximum value selection unit 50, the output value from the maximum value selection unit 50 is output as voltage reference value Vh*, and when the output value from the maximum value selection unit 50 is smaller than the output value from the maximum value selection unit 52, the output value from the maximum value selection unit 52 is output as voltage reference value Vh*.

Subtraction unit 56 computes a voltage deviation based on a difference between voltage reference value Vh* and supply voltage value Vh, and outputs the voltage deviation to proportional integration unit (PI) 58. Proportional integration unit 58 includes at least a proportional element (P) and an integral element (I), and outputs to subtraction unit 62 an operation signal in accordance with the input voltage deviation. Subtraction unit 56 and proportional integration unit 58 constitute a voltage feedback control element.

Subtraction unit 62 inverts the sign of the operation signal output from proportional integration unit 58, adds battery voltage value Vb1 of power storage unit BAT1/voltage reference value Vh* calculated in division unit 60, and outputs a duty command Ton1. Battery voltage value Vb1/voltage reference value Vh* is the reciprocal of a theoretical boost ratio in converter CONV1. Division unit 60 and subtraction unit 62 constitute a voltage feedforward control element. Even if an output value from proportional integration unit 58 is zero immediately after the start of the control, a value obtained by the voltage feedforward control element is output as duty command Ton1. Duty command Ton1 is a control command defining on-duty of transistor Q1B (FIG. 2) of converter CONV1.

Modulation unit 64 compares a carrier wave generated by an oscillation unit not shown with duty command Ton1, generates switching command PWC1, and supplies switching command PWC1 to converter CONV1.

On the other hand, current reference value determination unit 80 determines current reference value Ib2* by determining discharge power to be allotted to power storage unit BAT2 so as not to exceed discharge allowable power Wout2, based on electric power actual values P1, P2 received from HV_ECU 4, and by dividing the discharge power by battery voltage value Vb2. The discharge power to be allotted to power storage unit BAT2 can be determined arbitrarily as long as it does not exceed discharge allowable power Wout2.

Subtraction unit 66 computes a current deviation based on a difference between current reference value Ib2* and battery current value Ib2, and outputs the current deviation to proportional integration unit (PI) 68. Proportional integration unit 68 includes at least a proportional element and an integral element as with proportional integration unit 58 described above, and outputs to subtraction unit 72 an operation signal in accordance with the input current deviation. Subtraction unit 66 and proportional integration unit 68 constitute a current feedback control element.

Subtraction unit 72 inverts the sign of the operation signal output from proportional integration unit 68, adds battery voltage value Vb2 of power storage unit BAT2/voltage reference value Vh* calculated in division unit 70, and outputs a duty command Ton2. Battery voltage value Vb2/voltage reference value Vh* is the reciprocal of a theoretical boost ratio in converter CONV2. Division unit 70 and subtraction unit 72 constitute a voltage feedforward control element. Even if an output value from proportional integration unit 68 is zero immediately after the start of the control, a value obtained by the voltage feedforward control element is output as duty command Ton2. Duty command Ton2 is a control command defining on-duty of transistor Q2A (FIG. 3) of converter CONV2.

As described above, switching command PWC1 for controlling converter CONV1 is generated by the control computation including the voltage feedback control element and the voltage feedforward control element, and switching command PWC2 for controlling converter CONV2 is generated by the control computation including the current feedback control element and the voltage feedforward control element.

It is to be noted that, although control block 200 shown in FIG. 5 can also be implemented by configuring control unit 2 to include a circuit corresponding to each block, in many cases, control block 200 is implemented by control unit 2 executing a process routine in accordance with a preset program.

According to the first embodiment of the present invention, the voltage reference value is limited so as not to fall below the maximum battery voltage value of the battery voltage values of the first and second power storage units, and the first and second converters each perform the voltage conversion operation in accordance with the reference value. Since the voltage reference value is not less than a voltage value of the power line that can be charged by the power storage unit before control of the converter is started, each converter starts the voltage conversion operation immediately after the start of the control. Thereby, each converter operates to supply electric power from the connected power storage unit to the power line, and thus can avoid inflow of electric power from another power storage unit through the power line. Therefore, unwanted electric energy shift between the power storage units can be suppressed even when there is a voltage difference between the power storage units.

Further, according to the first embodiment of the present invention, since the switching commands for controlling the first and second converters are each generated by the control computation including the voltage feedforward control element, a value obtained by the voltage feedforward control element is output immediately after the start of the control. As a result, even if a time delay occurs due to an integral element of a proportional integration unit constituting a feedback control element, each converter performs the voltage conversion operation immediately after the start of the control. Thereby, a circulation current transiently flowing between the power storage units can be suppressed in particular.

Furthermore, according to the first embodiment of the present invention, since the second converter is controlled by the control computation including the current feedback control element, power supply/reception between the second converter and the second power storage unit, that is, power to be allotted to the second power storage unit, can be controlled. Consequently, power to be allotted to the first power storage unit can also be controlled. Thereby, power management of the first and second power storage units can also be performed.

[Variation]

In the first embodiment of the present invention, the description has been given of the configuration in which converters CONV1 and CONV2 are controlled by the control computation including the voltage feedback control element and the control computation including the current feedback control element, respectively. In a variation of the first embodiment of the present invention, a description will be given of a configuration in which converters CONV1 and CONV2 are each controlled by a control computation including a voltage feedback control element.

Since a target power supply system is the same as power supply system 1 shown in FIG. 1, the detailed description thereof will not be repeated.

Figure 6:
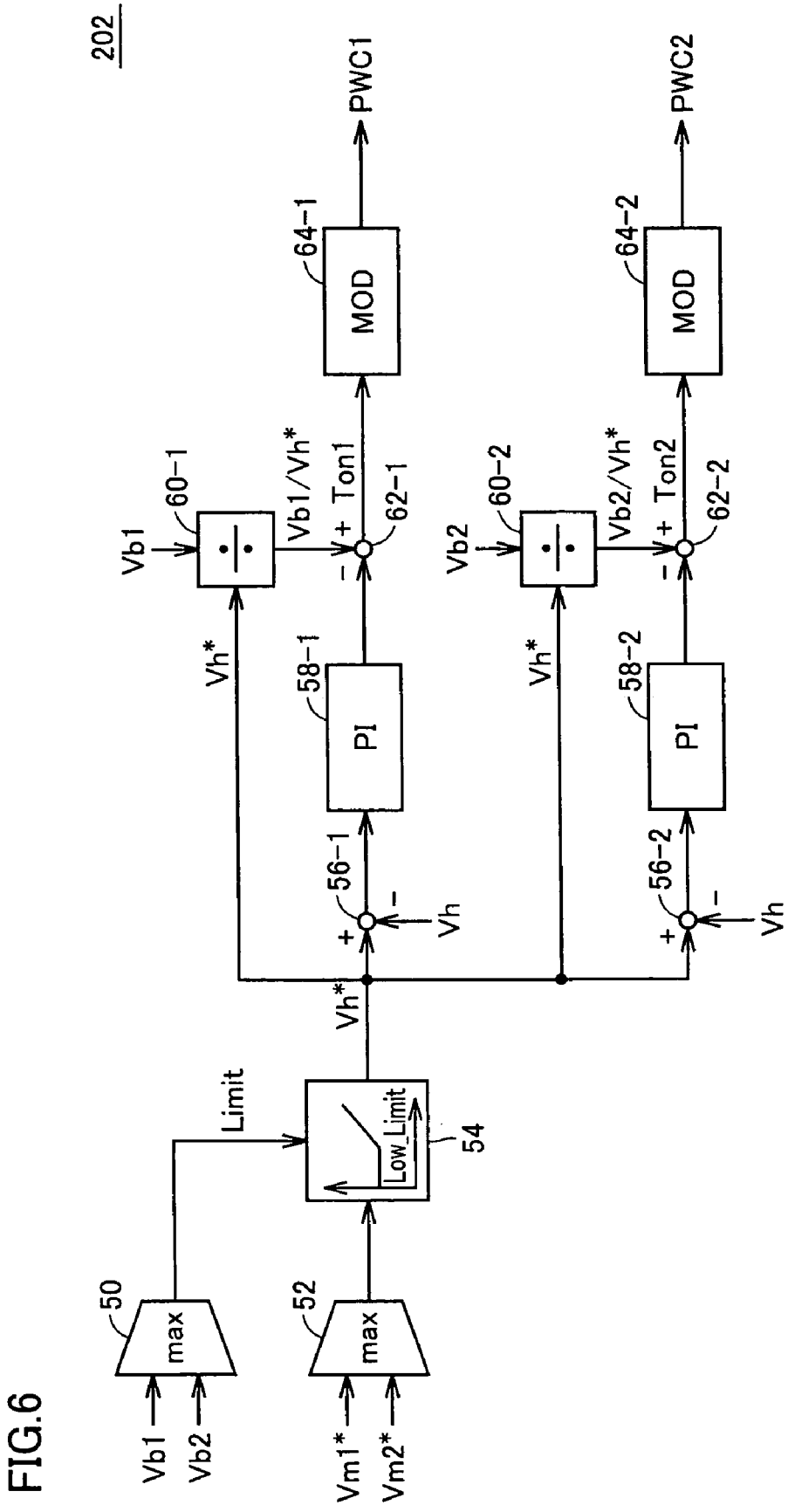
FIG. 6 is a view showing a control block for controlling a converter in accordance with a variation of the first embodiment of the present invention.

Referring to FIG. 6, a control block 202 for controlling converters CONV1, CONV2 in accordance with the variation of the first embodiment of the present invention will be described. Control block 202 includes the maximum value selection units 50, 52, lower limit value limiting unit 54, subtraction units 56-1, 56-2, 62-1, 62-2, proportional integration units (PI) 58-1, 58-2, division units 60-1, 60-2, and modulation units 64-1, 64-2.

Since the maximum value selection units 50, 52 and lower limit value limiting unit 54 are the same as those in the embodiment of the present invention described above, the detailed description thereof will not be repeated.

Further, subtraction units 56-1, 56-2, proportional integration units 58-1, 58-2, division units 60-1, 60-2, subtraction units 62-1, 62-2, and modulation units 64-1, 64-2 are the same as subtraction unit 56, proportional integration unit 58, division unit 60, subtraction unit 62, and modulation unit 64 in the embodiment of the present invention described above, respectively.

Specifically, control block 202 outputs duty commands Ton1, Ton2, in accordance with control computations including voltage feedback control elements for matching supply voltage value Vh with voltage reference value Vh*, and voltage feedforward control elements adding values corresponding to ratios between battery voltage values Vb1, Vb2 and voltage reference value Vh* (voltage conversion ratios), respectively.

As for the rest, the variation is the same as the first embodiment of the present invention described above, and thus the detailed description thereof will not be repeated.

According to the variation of the first embodiment of the present invention, in addition to the effect obtained by the first embodiment of the present invention, the switching commands for the converters are generated through similar control computations. Therefore, the control structure can be simplified, and adjustment of such as control gain can be performed relatively easily.

Second Embodiment

The present invention is applicable to a power supply system having three or more power storage units, in addition to the power supply system having two power storage units described above.

Figure 7:
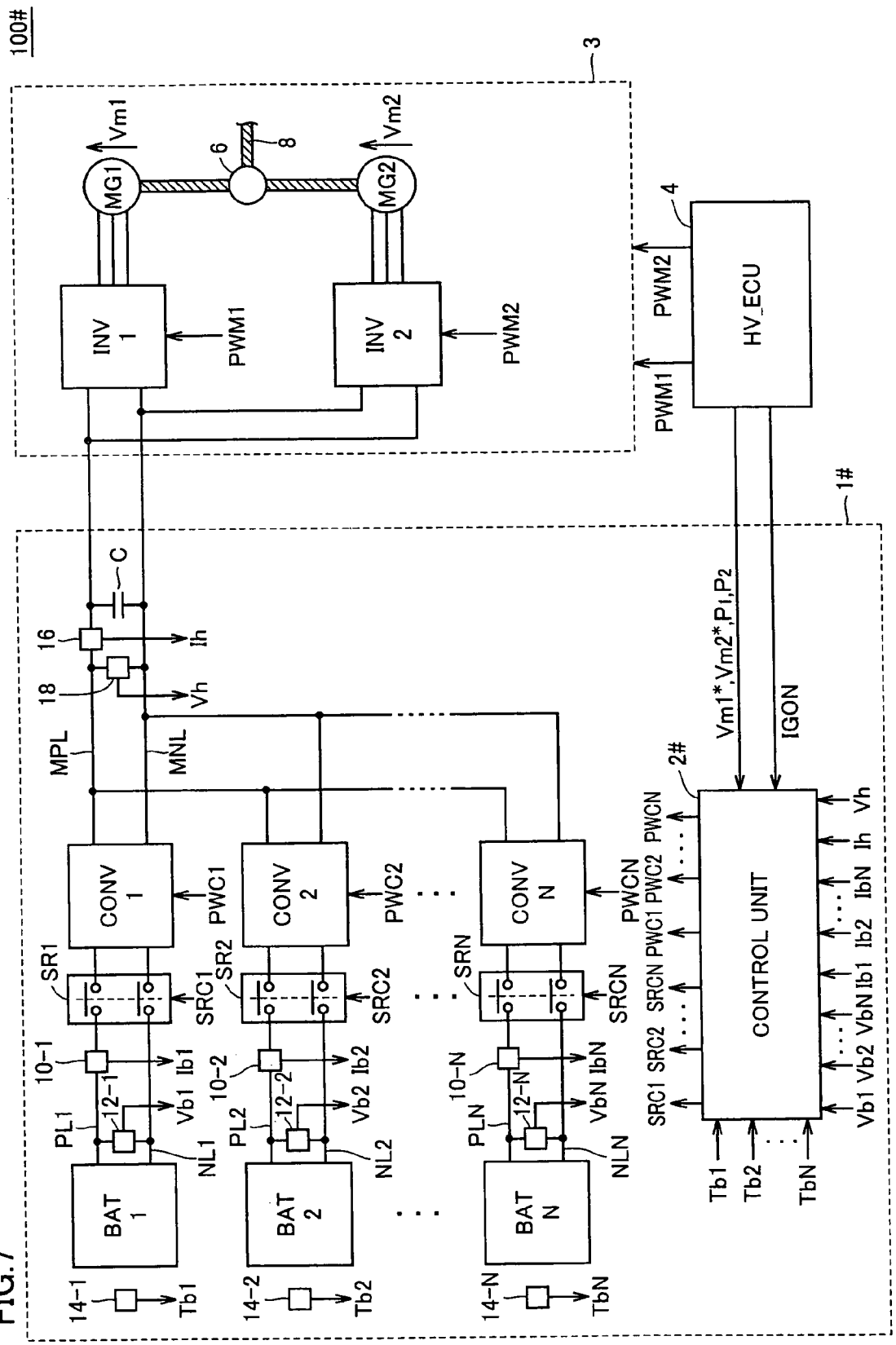
FIG. 7 is a schematic configuration diagram showing a substantial part of a vehicle including a power supply system in accordance with a second embodiment of the present invention.

Referring to FIG. 7, a vehicle 100# including a power supply system 1# in accordance with a second embodiment of the present invention will be described. Since vehicle 100# includes power supply system 1# arranged instead of power supply system 1 in vehicle 100 shown in FIG. 1, the detailed description of drive force generation unit 3 and HV_ECU 4 will not be repeated. In the second embodiment of the present invention, power supply system 1# including N power storage units will be described.

Power supply system 1# includes converters CONV1, CONV2, . . . , CONVN, power storage units BAT1, BAT2, . . . , BATN, system relays SR1, SR2, . . . , SRN, battery current value detection units 10-1, 10-2, . . . , 110-N, battery voltage value detection units 12-1, 12-2, . . . , 12-N, and battery temperature detection units 14-1, 14-2, . . . , 14-N, arranged instead of converters CONV1, CONV2, power storage units BAT1, BAT2, system relays SR1, SR2, battery current value detection units 10-1, 10-2, battery voltage value detection units 12-1, 12-2, and battery temperature detection units 14-1, 14-2 in power supply system 1 shown in FIG. 1, respectively. Further, power supply system 1# includes a control unit 2# arranged instead of control unit 2 in power supply system 1 shown in FIG. 1.

Converters CONV1 to CONVN are connected in parallel to main positive bus line MPL and main negative bus line MNL, and perform voltage conversion operation between respective power storage units BAT1 to BATN and main positive bus line MPL and main negative bus line MNL.

Power storage units BAT1 to BATN are connected in parallel to main positive bus line MPL and main negative bus line MNL through system relays SR1 to SRN and converters CONV1 to CONVN, respectively. Battery current value detection units 10-1 to 10-N, battery voltage value detection units 12-1 to 12-N, and battery temperature detection units 14-1 to 14-N are arranged in correspondence with power storage units BAT1 to BATN, respectively.

Upon receiving ignition-on signal IGON from HV_ECU 4, control unit 2# activates relay commands SRC1 to SRCN to turn on system relays SR1 to SRN. Then, control unit 2# determines the maximum value of required voltage values Vm1* to VmN* received from HV_ECU 4 as voltage reference value Vh* of the supply power, such that voltage reference value Vh* does not fall below the maximum battery voltage value of battery voltage values Vb1 to VbN, that is, the minimum value of voltage reference value Vh* is limited to the maximum battery voltage value. Then, control unit 2# generates switching commands PWC1 to PWCN such that converters CONV1 to CONVN perform the voltage conversion operation in accordance with voltage reference value Vh*.

Particularly in the second embodiment of the present invention, converter CONV1 performs the voltage conversion operation in response to a result of a control computation including a voltage feedback control element for matching supply voltage value Vh with voltage reference value Vh*, and a voltage feedforward control element adding a value corresponding to a ratio between battery voltage value Vb1 of power storage unit BAT1 and voltage reference value Vh* (voltage conversion ratio). On the other hand, converters CONV2 to CONVN perform the voltage conversion operation in response to results of control computations including current feedback control elements for matching battery current values Ib2 to IbN with current reference values Ib2* to IbN*, and voltage feedforward control elements adding values corresponding to ratios between battery voltage values Vb2 to VbN of power storage units BAT2 to BATN and voltage reference value Vh* (voltage conversion ratios), respectively. It is to be noted that current reference values Ib2* to IbN* are determined in accordance with the SOCs of power storage units BAT2 to BATN and a required electric power value of drive force generation unit 3.

Since voltage reference value Vh* is determined by reflecting battery voltage values Vb1 to VbN as described above, unwanted electric energy shift among power storage units BAT1 to BATN can be suppressed. Further, since the values corresponding to the ratios between battery voltage values Vb1 to VbN and voltage reference value Vh* (voltage conversion ratios) are output as initial values by the voltage feedforward control elements, converters CONV1 to CONVN can perform the voltage conversion operation immediately after the start of the control. Thereby, a circulation current among power storage units BAT1 to BATN that may be caused immediately after the start of control can be suppressed.

Further, control unit 2# calculates the states of charge SOC1 to SOCN in power storage units BAT1 to BATN, based on battery current values Ib1 to IbN, battery voltage values Vb1 to VbN, and battery temperatures Tb1 to TbN, respectively.

As for the rest, power supply system 1# is the same as that in the first embodiment of the present invention described above, and thus the detailed description thereof will not be repeated.

As to the correspondence between FIG. 7 and the invention of the present application, drive force generation unit 3 corresponds to the "load device", main positive bus line MPL and main negative bus line MNL correspond to the "power line", and converters CONV1 to CONVN correspond to the "plurality of voltage conversion units."

Figure 8:
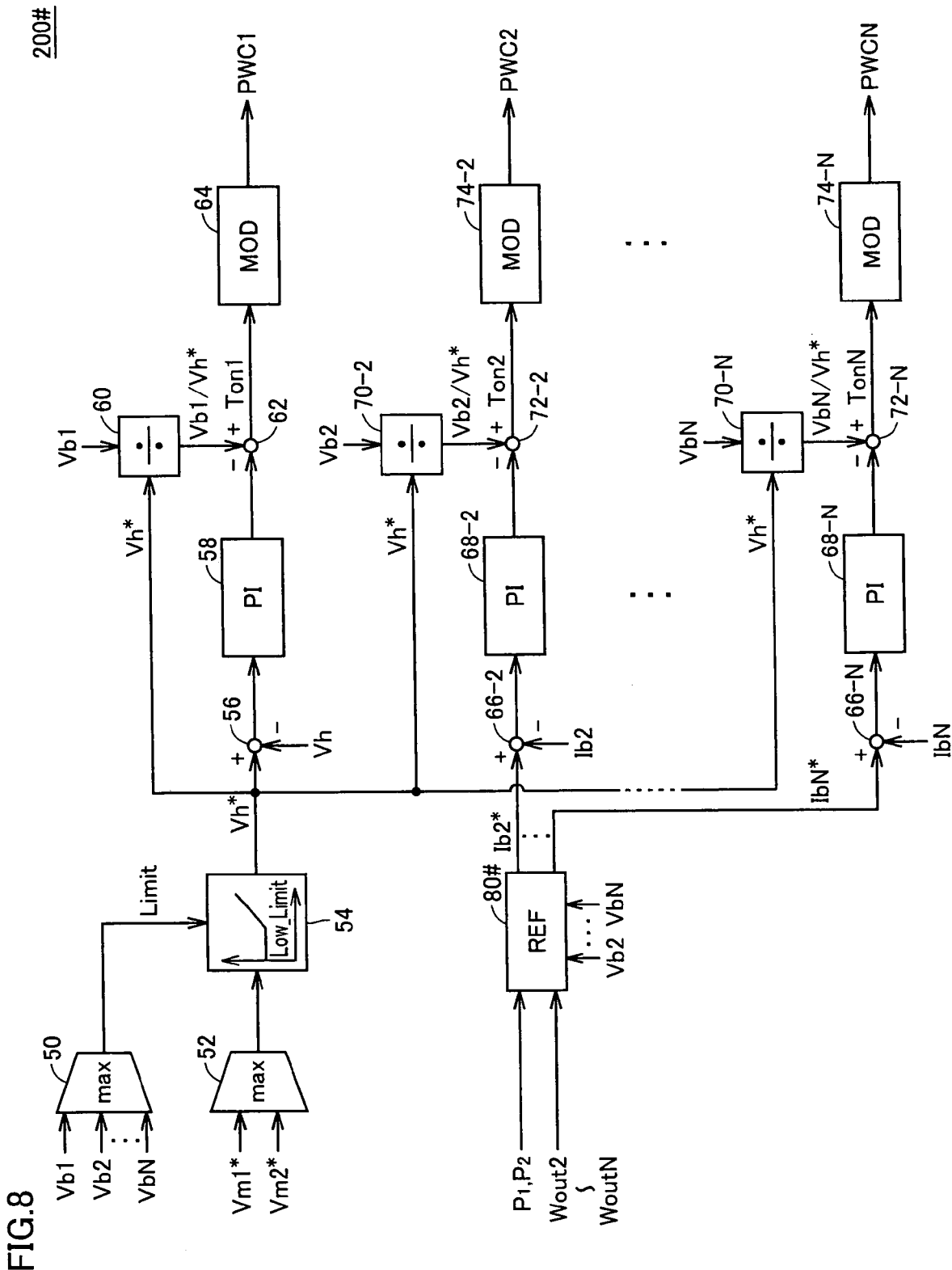
FIG. 8 is a view showing a control block for controlling a converter in accordance with the second embodiment of the present invention.

Referring to FIG. 8, a control block 200# for controlling converters CONV1 to CONVN in accordance with the second embodiment of the present invention will be described. Control block 200# includes subtraction units 66-2, . . . , 66-N, 72-2, . . . , 72-N, proportional integration units 68-2, . . . , 68-N, division units 70-2, . . . , 70-N, and modulation units 74-2, . . . , 74-N, arranged instead of subtraction units 66, 72, proportional integration unit 68, division unit 70, and modulation unit 74 in control block 200 shown in FIG. 5, respectively. Further, control block 200# includes a current reference value determination unit (REF) 80# arranged instead of current reference value determination unit (REF) 80 in control block 200 shown in FIG. 5.

Current reference value determination unit 80# determines discharge power to be allotted to power storage units BAT2 to BATN so as not to exceed discharge allowable power Wout2 to WoutN, respectively, based on electric power actual values P1, P2 received from HV_ECU 4. Further, current reference value determination unit 80# determines current reference values Ib2* to IbN* by dividing the respective discharge power by battery voltage values Vb2 to VbN, respectively.

Subtraction units 66-2 to 66-N compute current deviations based on differences between current reference values Ib2* to IbN* and battery current values Ib2 to IbN, respectively, and outputs the current deviations to proportional integration units 68-2 to 68-N, respectively. Proportional integration units 68-2 to 68-N each include at least a proportional element and an integral element, and output to subtraction units 72-2 to 72-N operation signals in accordance with the input current deviations, respectively. Subtraction units 66-2 to 66-N and proportional integration units 68-2 to 68-N constitute current feedback control elements, respectively.

Subtraction units 72-2 to 72-N invert the signs of the operation signals output from proportional integration units 68-2 to 68-N, add battery voltage value Vb2/voltage reference value Vh* to battery voltage value VbN/voltage reference value Vh* calculated in division units 70-2 to 70-N, and output duty commands Ton2 to TonN, respectively. Battery voltage value Vb2/voltage reference value Vh* to battery voltage value VbN/voltage reference value Vh* are the reciprocals of theoretical boost ratios in converters CONV2 to CONVN, respectively. Division units 70-2 to 70-N and subtraction units 72-2 to 72-N constitute voltage feedforward control elements, respectively.

As for the rest, control block 200# is the same as that in the first embodiment of the present invention described above, and thus the detailed description thereof will not be repeated.

According to the second embodiment of the present invention, the effect similar to that in the first embodiment of the present invention can be obtained even when the power supply system includes three or more converters and power storage units. Thereby, the number of converters and power storage units can be designed relatively freely in accordance with the required electric power value of the load device. Therefore, a power supply system capable of supplying electric power to load devices of various sizes and types and a vehicle including the power supply system can be implemented.

[Variation]

As in the variation of the first embodiment of the present invention, a description will be given of a configuration in which converters CONV1 to CONVN are each controlled by a control computation including a voltage feedback control element.

Since a target power supply system is the same as power supply system 1# shown in FIG. 7, the detailed description thereof will not be repeated.

Figure 9:
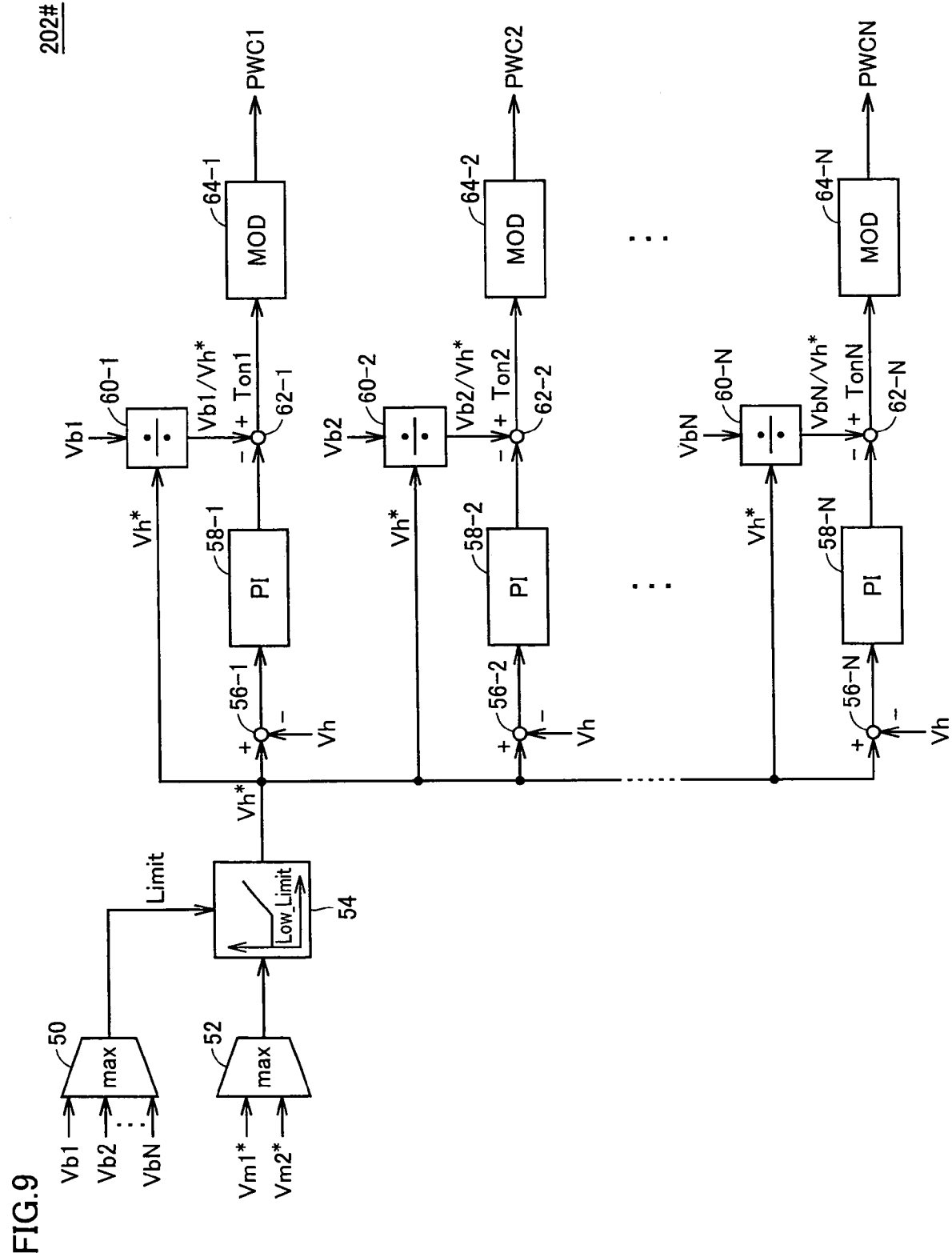
FIG. 9 is a view showing a control block for controlling a converter in accordance with a variation of the second embodiment of the present invention.

Referring to FIG. 9, a control block 202# for controlling converters CONV1 to CONVN in accordance with the variation of the second embodiment of the present invention will be described. Control block 200# is an extended version of control block 202 shown in FIG. 6, and includes subtraction units 56-1 to 56-N, 62-1 to 62-N, proportional integration units 58-1 to 58-N, division units 60-1 to 60-N, and modulation units 64-1 to 64-N, arranged instead of subtraction units 56-1, 56-2, 62-1, 62-2, proportional integration units 58-1, 58-2, division units 60-1, 60-2, and modulation units 64-1, 64-2 in control block 202, respectively. As for the rest, control block 202# is the same as control block 202, and thus the detailed description thereof will not be repeated.

Control block 202# outputs duty commands Ton1 to TonN, in accordance with control computations including voltage feedback control elements for matching supply voltage value Vh* with voltage reference value Vh*, and voltage feedforward control elements adding values corresponding to ratios between battery voltage values Vb1 to VbN and voltage reference value Vh* (voltage conversion ratios), respectively.

As for the rest, the variation is the same as the variation of the first embodiment of the present invention described above, and thus the detailed description thereof will not be repeated.

According to the variation of the second embodiment of the present invention, in addition to the effect obtained by the second embodiment of the present invention, the switching commands for the converters are generated through similar control computations. Therefore, even when the power supply system includes multiple converters, the control structure can be simplified, and adjustment of such as control gain can be performed relatively easily.

In the first and second embodiments of the present invention and the variations thereof, the description has been given of the configuration controlling each converter based on a control computation using a combination of a voltage feedback control element and a voltage feedforward control element, or based on a control computation using a combination of a current feedback control element and a voltage feedforward control element. However, any control computation may be used as long as it is configured such that voltage conversion operation is performed in accordance with a voltage reference value. For example, a control computation including only a voltage feedback control element, or a control computation including only a voltage feedforward control element may be used.

Further, in the first and second embodiments of the present invention and the variations thereof, the description has been given of the configuration employing a drive force generation unit including two motor-generators, as an example of the load device. However, the number of motor-generators is not limited. In addition, the load device is not limited to a drive force generation unit generating drive force for a vehicle, and the present invention is applicable to a device only consuming electric power as well as to a device capable of consuming and generating electric power.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power supply system having a plurality of power storage units each configured to be chargeable/dischargeable, comprising:

a power line configured to allow supply/reception of electric power between a load device and said power supply system;

a plurality of voltage conversion units provided between said plurality of power storage units and said power line, respectively, and each performing voltage conversion operation between corresponding said power storage unit and said power line;

power storage voltage value obtaining means obtaining a power storage voltage value for each of said plurality of power storage units; and voltage reference value determination means determining a voltage reference value of electric power to be supplied to said load device in accordance with torque and rotation speed values of said load device, each of said plurality of voltage conversion units performing said voltage conversion operation in accordance with said voltage reference value determined by said voltage reference value determination means so that a voltage supplied to the load device is substantially equal to the voltage reference value, said voltage reference value determination means limiting said voltage reference value not to fall below the maximum power storage voltage value of said power storage voltage values obtained by said power storage voltage value obtaining means.

2. The power supply system according to claim 1, further comprising required voltage value obtaining means obtaining at least one required voltage value for said load device, and wherein said voltage reference value determination means further determines said voltage reference value to be not less than the maximum required voltage value of said at least one required voltage value obtained by said required voltage value obtaining means.

3. The power supply system according to claim 1, further comprising voltage value detection means detecting a voltage value of said power line, wherein at least one of said plurality of voltage conversion units performs said voltage conversion operation in response to a result of a computation including a voltage feedback control element for matching the voltage value of said power line detected by said voltage value detection means with said voltage reference value.

4. The power supply system according to claim 1, wherein at least one of said plurality of voltage conversion units performs said voltage conversion operation in response to a result of a computation including a voltage feedforward control element reflecting a value corresponding to a ratio between the power storage voltage value of corresponding said power storage unit and said voltage reference value.

5. The power supply system according to claim 4, further comprising battery current value detection means detecting a battery current value input/output to/from at least one of said plurality of power storage units, wherein said at least one voltage conversion unit performing said voltage conversion operation in response to the result of the computation including said voltage feedforward control element performs said voltage conversion operation in response to a result of a computation including a current feedback control element for matching the battery current value of corresponding said power storage unit detected by said battery current value detection means with each current reference value.

6. The power supply system according to claim 1, wherein each of said plurality of voltage conversion units includes a chopper circuit.

7. A power supply system having a plurality of power storage units each configured to be chargeable/dischargeable, comprising:

a power line configured to allow supply/reception of electric power between a load device and said power supply system;

a plurality of voltage conversion units provided between said plurality of power storage units and said power line, respectively, and each performing voltage conversion operation between corresponding said power storage unit and said power line;

a power storage voltage value detection unit detecting a power storage voltage value for each of said plurality of power storage units; and a control unit, said control unit determining a voltage reference value of electric power to be supplied to said load device in accordance with torque and rotation speed values of said load device, each of said plurality of voltage conversion units performing said voltage conversion operation in accordance with said voltage reference value determined by said control unit so that a voltage supplied to the load device is substantially equal to the voltage reference value, said control unit limiting said voltage reference value not to fall below the maximum power storage voltage value of said power storage voltage values detected by said power storage voltage value detection unit.

8. A vehicle, comprising:

a power supply system having a plurality of power storage units each configured to be chargeable/dischargeable; and a drive force generation unit receiving electric power supplied from said power supply system to generate drive force, said power supply system including:

a power line configured to allow supply/reception of electric power between said drive force generation unit and said power supply system;

a plurality of voltage conversion units provided between said plurality of power storage units and said power line, respectively, and each performing voltage conversion operation between corresponding said power storage unit and said power line;

power storage voltage value obtaining means obtaining a power storage voltage value for each of said plurality of power storage units; and voltage reference value determination means determining a voltage reference value of electric power to be supplied to said drive force generation unit in accordance with torque and rotation speed values of said drive force generation unit, each of said plurality of voltage conversion units performing said voltage conversion operation in accordance with said voltage reference value determined by said voltage reference value determination means so that a voltage supplied to the drive force generation unit is substantially equal to the voltage reference value, said voltage reference value determination means limiting said voltage reference value not to fall below the maximum power storage voltage value of said power storage voltage values obtained by said power storage voltage value obtaining means.

9. The vehicle according to claim 8, wherein said drive force generation unit includes at least one power conversion unit configured to be capable of converting the electric power supplied from said power supply system, and at least one electric rotating machine connected to corresponding said power conversion unit and configured to be capable of generating said drive force.

10. The vehicle according to claim 8, wherein said power supply system further includes required voltage value obtaining means obtaining at least one required voltage value for said drive force generation unit, and said voltage reference value determination means further determines said voltage reference value to be not less than the maximum required voltage value of said at least one required voltage value obtained by said required voltage value obtaining means.

11. The vehicle according to claim 8, wherein said power supply system further includes voltage value detection means detecting a voltage value of said power line, and at least one of said plurality of voltage conversion units performs said voltage conversion operation in response to a result of a computation including a voltage feedback control element for matching the voltage value of said power line detected by said voltage value detection means with said voltage reference value.

12. The vehicle according to claim 8, wherein at least one of said plurality of voltage conversion units performs said voltage conversion operation in response to a result of a computation including a voltage feedforward control element reflecting a value corresponding to a ratio between the power storage voltage value of corresponding said power storage unit and said voltage reference value.

13. The vehicle according to claim 12, wherein said power supply system further includes battery current value detection means detecting a battery current value input/output to/from at least one of said plurality of power storage units, and said at least one voltage conversion unit performing said voltage conversion operation in response to the result of the computation including said voltage feedforward control element performs said voltage conversion operation in response to a result of a computation including a current feedback control element for matching the battery current value of corresponding said power storage unit detected by said battery current value detection means with each current reference value.

14. The vehicle according to claim 8, wherein each of said plurality of voltage conversion units includes a chopper circuit.

15. A vehicle, comprising:

a power supply system having a plurality of power storage units each configured to be chargeable/dischargeable; and a drive force generation unit receiving electric power supplied from said power supply system to generate drive force, said power supply system including:

a power line configured to allow supply/reception of electric power between said drive force generation unit and said power supply system;

a plurality of voltage conversion units provided between said plurality of power storage units and said power line, respectively, and each performing voltage conversion operation between corresponding said power storage unit and said power line;

power storage voltage value detection unit detecting a power storage voltage value for each of said plurality of power storage units; and a control unit, said control unit determining a voltage reference value of electric power to be supplied to said drive force generation unit in accordance with torque and rotation speed values of said drive force generation unit, each of said plurality of voltage conversion units performing said voltage conversion operation in accordance with said voltage reference value determined by said control unit so that a voltage supplied to the load device is substantially equal to the voltage reference value, and said control unit limiting said voltage reference value not to fall below the maximum power storage voltage value of said power storage voltage values detected by said power storage voltage value detection unit.

* * * * *

UNITED STATES PATENT AND TRADEMARK OFFICE
CERTIFICATE OF CORRECTION

| | | |
|---|---|---|
| PATENT NO. | : 7,750,505 B2 | Page 1 of 1 |
| APPLICATION NO. | : 12/226346 | |
| DATED | : July 6, 2010 | |
| INVENTOR(S) | : Shinji Ichikawa | |

It is certified that error appears in the above-identified patent and that said Letters Patent is hereby corrected as shown below:

On the Title page, item (87), line 2

Change: "PCT Pub Date: Jan. 11, 2007"
To: -- PCT Pub Date: Nov. 11, 2007 --

Signed and Sealed this

Twenty-third Day of November, 2010

David J. Kappos
*Director of the United States Patent and Trademark Office*